(12) United States Patent
Minami (10) Patent No.: US 6,310,558 B1
(45) Date of Patent: Oct. 30, 2001

(54) SELECTIVE CALLING SYSTEM AND SELECTIVE CALLING RECEIVER (75) Inventor: Yoichiro Minami, Tokyo (JP)

(73) Assignee: NEC Corporation, Tokyo (JP)

(*) Notice: Subject to any disclaimer, the term of this patent is extended or adjusted under 35 U.S.C. 154(b) by 1023 days.

(21) Appl. No.: 08/502,253

(22) Filed: Jul. 13, 1995

(30) Foreign Application Priority Data

Jul. 15, 1994 (JP) .................................................... 6-186237

(51) Int. Cl.$^7$ ...................................................... G08B 5/22
(52) U.S. Cl. ............................... 340/825.52; 340/825.44; 340/825.47; 370/349
(58) Field of Search ......................... 340/825.52, 825.44, 340/825.2, 825.21, 825.47; 370/82, 101.1, 105.1, 347–349

(56) References Cited

U.S. PATENT DOCUMENTS

| | | | |
|---|---|---|---|
| 4,479,124 | * 10/1984 | Rodriguez et al. | 340/825.44 |
| 4,668,949 | * 5/1987 | Akahori et al. | 340/825.47 |
| 5,089,813 | * 2/1992 | DeLuca et al. | 340/825.44 |
| 5,315,635 | * 5/1994 | Kane et al. | 455/31.2 |
| 5,363,090 | * 11/1994 | Cannon et al. | 340/825.44 |

FOREIGN PATENT DOCUMENTS

| | | |
|---|---|---|
| 2114343 | 8/1983 | (GB). |
| 63158924 | 7/1988 | (JP). |

* cited by examiner

Primary Examiner—William A. Cuchlinski, Jr.
Assistant Examiner—Yonel Beaulieu
(74) Attorney, Agent, or Firm—Sughrue, Mion, Zinn, Macpeak & Seas, PLLC (57) ABSTRACT A transmission signal frame format includes an address field and a message field. The address field includes a plurality of addresses associated with the subscriber's receivers to be called, respectively. The message field includes a plurality of messages corresponding to the addresses, respectively. A message includes a transmitting sequence number which is coincident with the transmitting order of the address corresponding to this message. A selective calling receiver, receiving a frame, sequentially searches the address field for the ID address of its own while incrementing a receiving sequence count at each the address. When the ID address is found, the receiver stores the receiving sequence count at that time. The receiver selects its own message data from the message field when the transmitting sequence number of a message is coincident with the receiving sequence count.

27 Claims, 5 Drawing Sheets

MESSAGE HEADER MH

| F | A | T | N |
|---|---|---|---|
| 1 | 0 0 1 0 1 | 1 0 | 0 0 0 1 1 1 0 |

```
F : MESSAGE HEADER INDICATOR  (1 BIT)
A : ADDRESS TRANS. NUMBER     (5 BITS)
T : MESSAGE TYPE              (2 BITS)
N : MESSAGE LENGTH            (7 BITS)
```

FIG.3

WORD FORMAT

| INFO BIT | PARITY BIT | E |
|---|---|---|
| (21 BITS) | (10 BITS) | (1 BIT) |

SELECTIVE CALLING SYSTEM AND SELECTIVE CALLING RECEIVER

BACKGROUND OF THE INVENTION

1. Field of the Invention

The present invention relates to a selective calling system, and more specifically to a format of a transmission signal, a method associated with transmitting and receiving the transmission signal and a receiver for receiving the transmission signal.

2. Related Art

As to a selective calling receiver which is usually taken on the road, the life of a battery as a power supply is a fundamental performance category. Especially, with the miniaturization of the receiver includes in recent years, a smaller battery is increasingly demanded. Therefore, how to make the battery life long becomes a more important technical problem.

The battery life is determined by two main parameters: the amount of the power consumption of the receiver and the intermittent receiving interval. Since a considerable portion of the power consumption is made in a radio frequency system, so far as a receiving operation is performed, one can not hope for a drastic improvement of the power consumption. Then, a method of making the intermittent receiving interval longer is proposed to reduce an average power consumption. In order to make the intermittent receiving interval longer, a synchronous system is under consideration in place of an asynchronous system (for example, POCSAG system) which is used widely at present. One example of the synchronous system is ERMES (European Radio Message System).

ERMES employs the following method. A frame number is given to each time division frame in advance and a base station transmits a calling signal with the frame number which a certain receiver should receive. This method allows the intermittent receiving interval to be lengthened dramatically as compared with the asynchronous system.

A transmitting signal of ERMES is comprised of a synchronization field, an address field and a message field. The message field is further comprised of a message and a message header indicating attributes of the message. Since the message header indicates which address the message belongs to, the transmission order of the message can be determined arbitrarily regardless of its address. For example, a paging system which is disclosed in Japanese Patent Unexamined Publication No. 63-158924 (publication date: Jul. 1st, 1988) employs a method for lengthening a receiving internal by designating the frame number which should be received.

However, the conventional selective calling system mentioned above needs a complicated system configuration. Further, a lot of additional bits are required in a transmission message signal, resulting in increased overhead of the message signal, which causes the message transmission efficiency to be reduced. Therefore, even though a high-speed transmission system is adopted, the expected increase of the subscriber capacity cannot be achieved.

SUMMARY OF THE INVENTION

An object of the present invention is to provide a data communication method which achieves an improved transmission efficiency, a larger capacity of subscribers and lower power consumption of a subscriber receiver.

Another object of the present invention is to provide a receiving method which achieves high reliability of receiving message signals with simple steps.

Still another object of the present invention is to provide a selective calling data which achieves receiving of message signals with high reliability, simple structure and lower power consumption.

A transmission signal format according to the present invention is as follows. A specific time period is divided into a plurality of frames. Each the frame is comprised of a synchronization field, an address field, and a message field. The address field is comprised of a plurality of addresses associated with the subscriber's receivers, respectively. The message field is comprised of a plurality of messages corresponding to the addresses, respectively. A message is comprised of a message and a message header which includes a transmitting sequence number of the address corresponding to that message.

A base station transmits the transmission signals to the receivers. The receiver receives a frame of each transmission signal intermittently. When receiving the frame, the receiver sequentially searches the address field for an ID address of the receiver itself while incrementing a receiving sequence count at each address. When the ID address is found, the receiver stores the receiving sequence count at that time. Subsequently, the receiver searches the message field for the message corresponding to the ID address by comparing the receiving sequence count stored with the transmitting sequence number included in the message. When the transmitting sequence number is coincident with the receiving sequence count, the message data addressed to the receiver is detected from the message field.

The address field is preferably terminated by a predetermined word. The receiver stops searching the address field when the predetermined word is found, and then back to the receiving step.

More specifically, the message header is further comprised of a first field for containing a message header indicator, a second field for containing the transmitting sequence number, a third field for containing a message type, and a fourth field for containing a message length. In this case, the receiver detects a message header from the message field when comparing the receiving sequence count stored with the transmitting sequence number included in the message header. And, the message addressed to the receiver itself is input using the message type and the message length when the receiving sequence count stored is coincident with the transmitting sequence number.

As described above, the communication method according to the present invention provides the relationship between a transmission order of each address in an address field and an address transmission number of each message header in a message field in each message frame. Therefore, a message is defined by a short message header even when a synchronous system is employed.

In addition, the selective calling receiver according to the present invention stores the transmission order of its own address in the address field of the message frame received. When the transmission order stored is coincident with the transmission sequence number of the message header, the receiver selects the message data following the message header as a message addressed to the receiver itself. Therefore, high reliability can be realized with a simple structure.

DETAILED DESCRIPTION OF THE PREFERRED EMBODIMENT

A frame of a message transmission signal is determined in such a manner that a specific time period is equally divided into a plurality of frames. For example, if one minute is equally divided by 120, a single frame has a time period of 0.5 seconds. When employing a transmission rate of 9600 bps and a word format of the BCH (31,21) code, a frame of 0.5 second consists of 150 words. The word format will be shown in FIG. 4. In this case, a selective calling receiver performs a receiving operation during only one frame of 120 frames. Which frame is received is decided depending on the purpose of use.

Signal Frame Format

Figure 1:
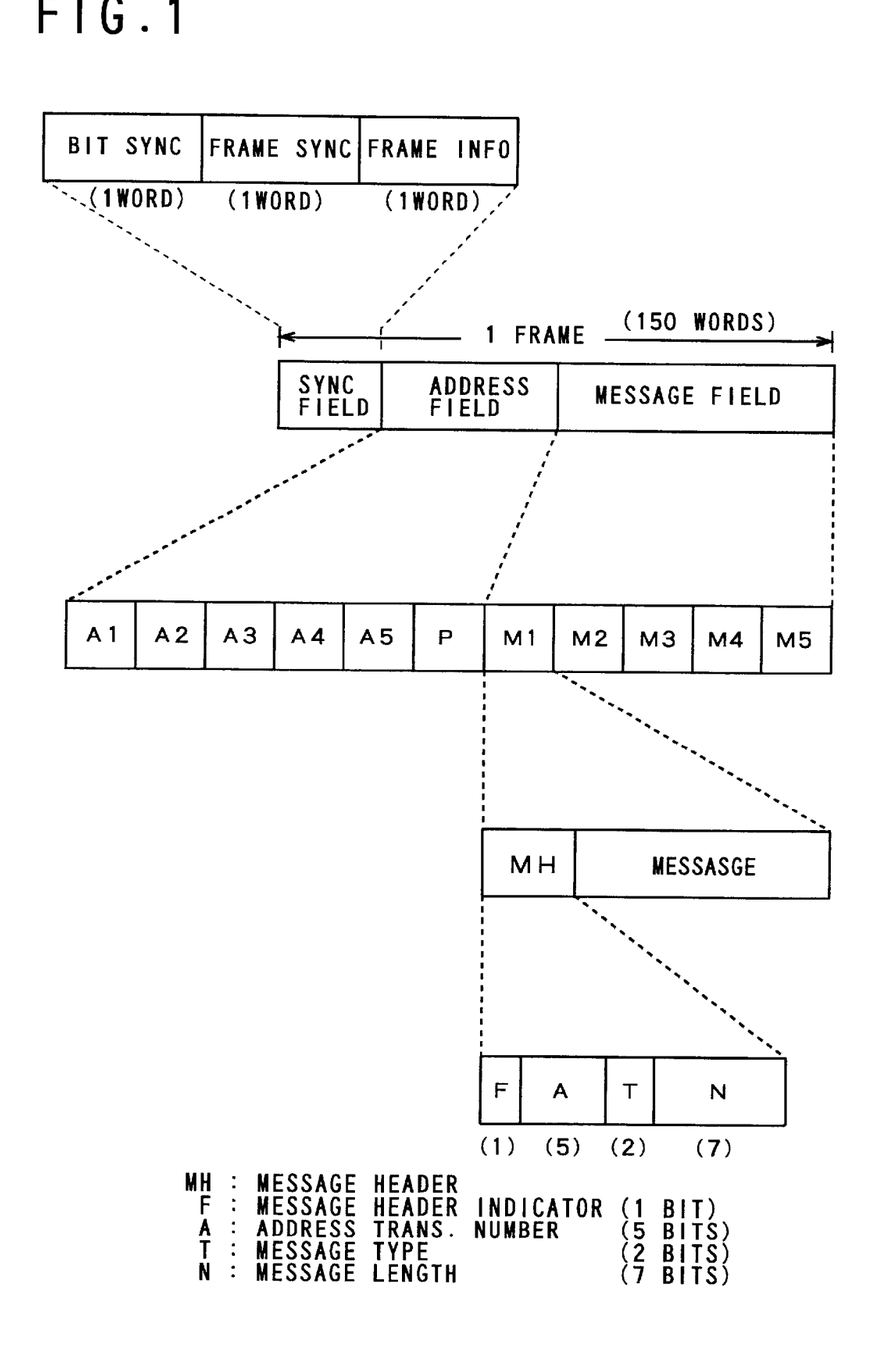
FIG. 1 is a diagram illustrating a frame structure of a message signal according to an embodiment of the present invention.

As illustrated in FIG. 1, a frame of 150 words is comprised of a synchronization (SYNC) field, an address field and a message field. The SYNC field is further comprised of a bit synchronization signal, a frame synchronization signal and a frame information signal, each signal having a length of one word. The selective calling receiver corrects a bit error by using the bit synchronization signal of the synchronization field and establishes word synchronization by using the frame synchronization signal. The frame information signal of the synchronization field includes a frame number signal (8 bits), a time information signal (5 bits) and another frame information signal (8 bits), which are not shown. If a frame is previously set at a predetermined time period and the frame #0 is coincident with a certain time instant, the receiver obtains time information by receiving the frames. In addition, the receiver can also realize some functions such as displaying the time of day and the time of receiving the message by monitoring the time information signal (5 bits) of the frame information signal.

The address field, as shown in FIG. 1, is a set of addresses (here five addresses A1–A5) each having a length of one word. In the case of the BCH (31,21) code, since one word has an information field of 21 bits, it is possible to address up to about 2 millions users. The address field is terminated by the address end word P. When detecting the address end word P, the receiver judges that there is no address of its own within the frame received, and terminates the address retrieval. Note that the address transmission order in the address field is previously determined in the base station.

The message field is a set of submessages (here five submessages M1–M5) each having a variable length and comprising a message header MH and a message. The message header MH is further comprised of a message header indicating signal F (1 bit), an address transmission number signal A (5 bits), a message type signal T (2 bits), and a message length signal N (7 bits), totaling to 15 bits. The remaining bits except for the message header MH of one word are managed as a message. Therefore, this embodiment is capable of defining a message using the overhead of 15 bits, resulting in drastically improved efficiency of message transmission as compared with the conventional system.

The message header indicating signal F is a binary bit which discriminates between the message header MH and code words of the message according to the value 0 or 1. For example, the value 1 indicates the message header MH and the value 0 indicates the message code words. Therefore, the receiver may search for a message header MH by only checking the 1st bit of each word.

The address transmission number signal A indicates the transmission order of each address (A1–A5) within the address field. For example, the message header MH corresponding to the first address A1 which is transmitted at first has the address transmission number A='1'. The message header MH corresponding to the fifth address A5 has the address transmission number A='5'. As described later, the receiver searches the address field for its own address. When detecting the address of its own, the receiver stores the number of addresses checked so far, that is, the address transmission order. Subsequently, while retrieving the message field, the receiver finds the message having an address transmission number A coincident with the number of addresses stored.

The message type signal T shows the type of a message which is transmitted following the message header MH. As an example, the message type signal T of 2 bits is defined as shown in table 1.

TABLE 1

| 2-bit Message Type signal | Message Type |
| --- | --- |
| 00 | Tone only |
| 01 | Numeric (4 bits/character) |
| 10 | Alphanumeric (7 bits/character) |
| 11 | Reserved |

In the embodiment, up to 4 types of a message can be identified and the fourth message type of T='11' is reserved. By defining it in another way, for example, binary data may be transmitted.

The message length signal N indicates the length of a message or the number of code words in a message. Since the message length signal N is 7 bits in length, it can specify a message length of up to 128 words. When receiving a message, the receiver counts the number of words of the message while comparing the count with the message length signal N. When the count reaches the message length N, the receiver judges the end of the message addressed to itself. Since the length of a message is indicated by the message length signal N, a more accurate message display can be achieved, resulting in higher reliability as compared with the case where a message display range is decided by only the message header indicating signal F.

Figure 2:
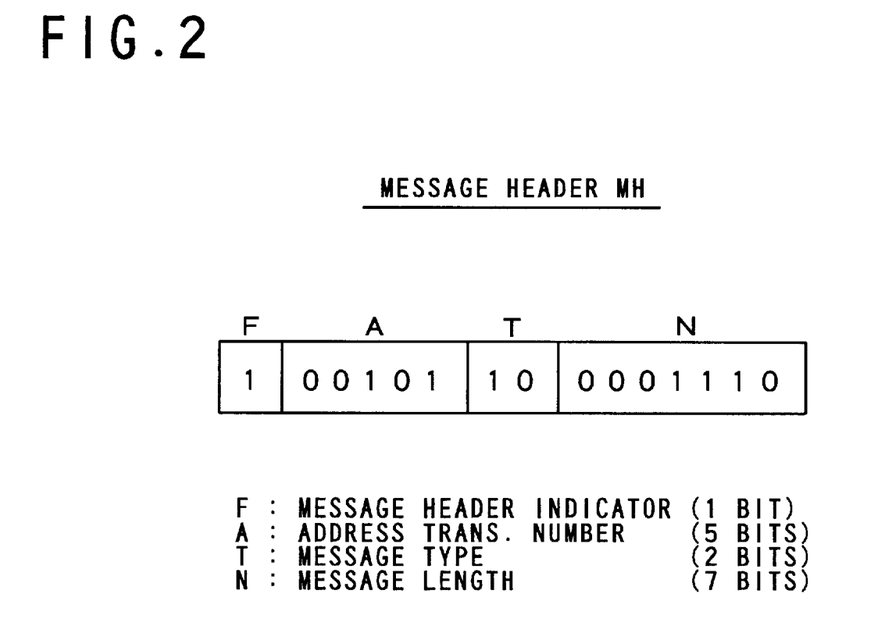
FIG. 2 is a diagram illustrating an example of a message header MH in the message signal format of FIG. 1.

FIG. 2 shows one example of a message header MH. Since the bit string '100101100001110' has the 1st bit of '1', this word includes a message header. Since the address transmission number A is '00101', this message is the 5th submessage M5 corresponding to the address A5. Since the message type T is '10', the message type is an alphanumeric. Finally, since the message length signal N is '0001110', this message consists of 40 characters.

Figure 3:
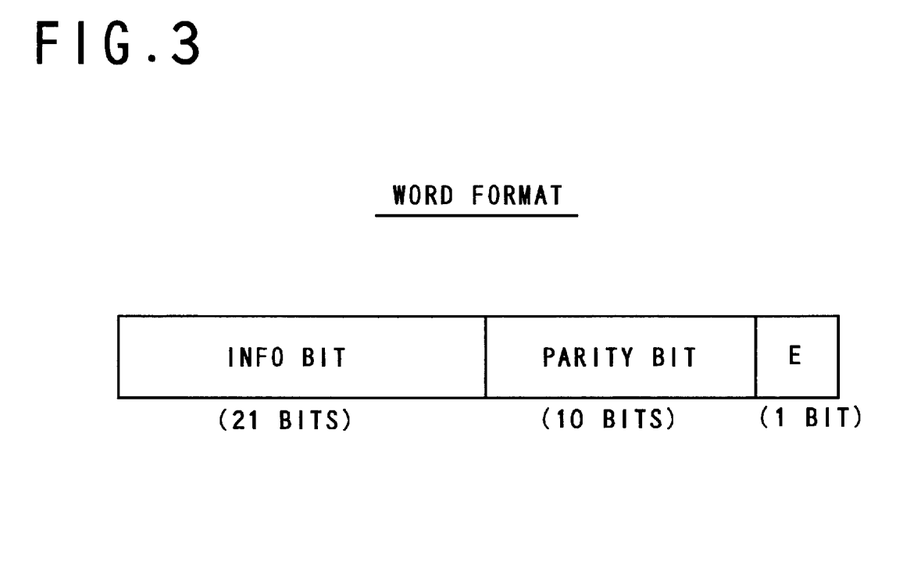
FIG. 3 is a diagram illustrating a word format of BCH (31,21) code employed in the present embodiment.

It should be noted that a word used in this embodiment is a BCH code, for example, the BCH (31,21) code of 32 bits which is used in POCSAG system. A word format of the BCH (31,21) code is shown in FIG. 3. One word is comprised of an information bit field of 21 bits, a parity bit field of 10 bits, and an even-number parity bit.

Base Station

Figure 4:
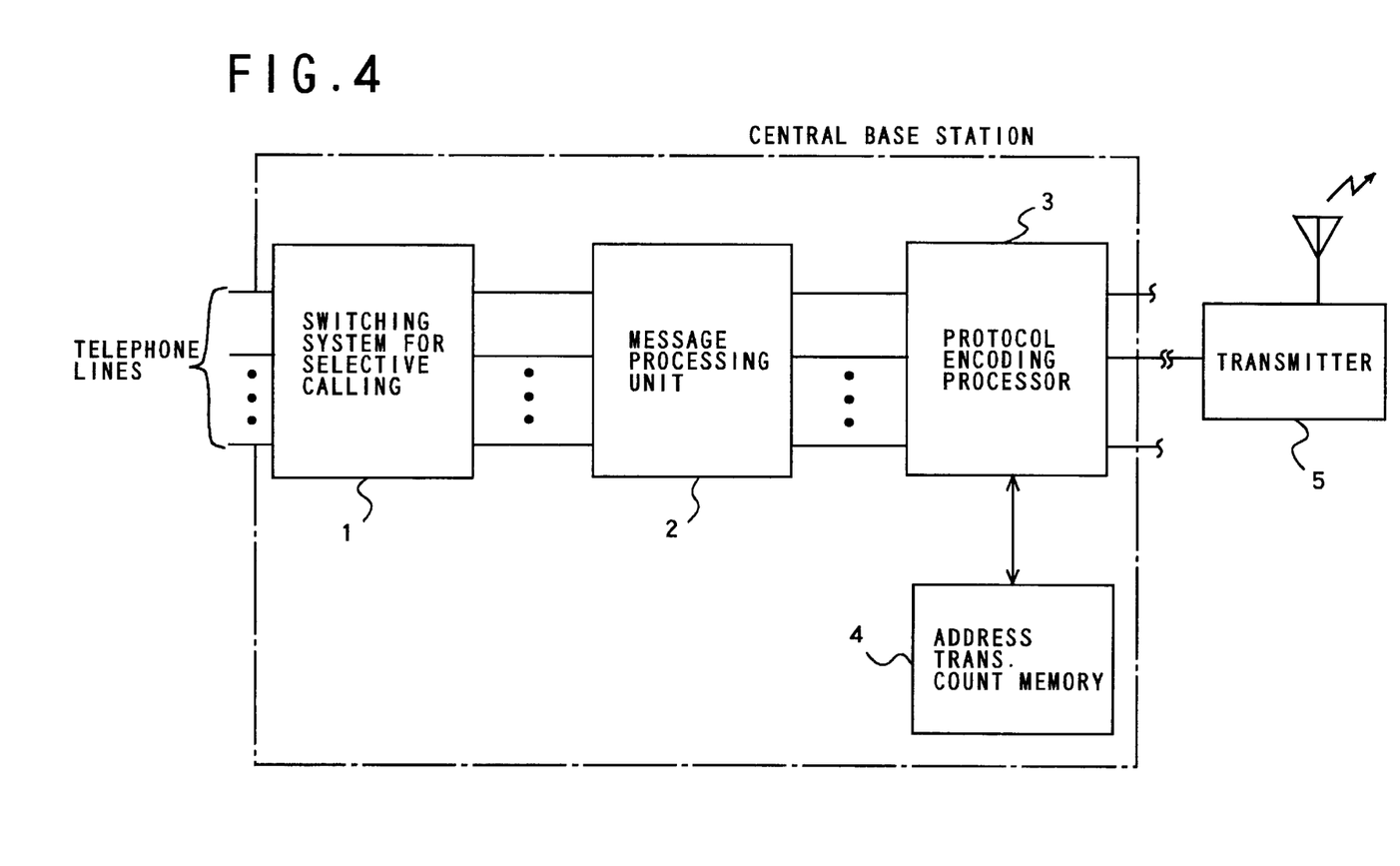
FIG. 4 is a block diagram showing a base station in a selective calling system of an embodiment according to the present invention.

As shown in FIG. 4, a plurality of telephone lines are connected to a switching system 1 of a central base station. A calling number and a message received from the telephone set of a calling party are transferred to a message processing unit 2 through the switching system 1. The message processing unit 2 generates necessary message data for selective calling and transfers it to a protocol encoding processor 3. The protocol encoding processor 3 generates a transmission signal having the frame format as shown in FIGS. 1–3 using an address transmission count memory 4. In this way, the transmission signal is transmitted from the transmitter 5 to the selective calling receivers.

Selective Calling Receiver

Figure 5:
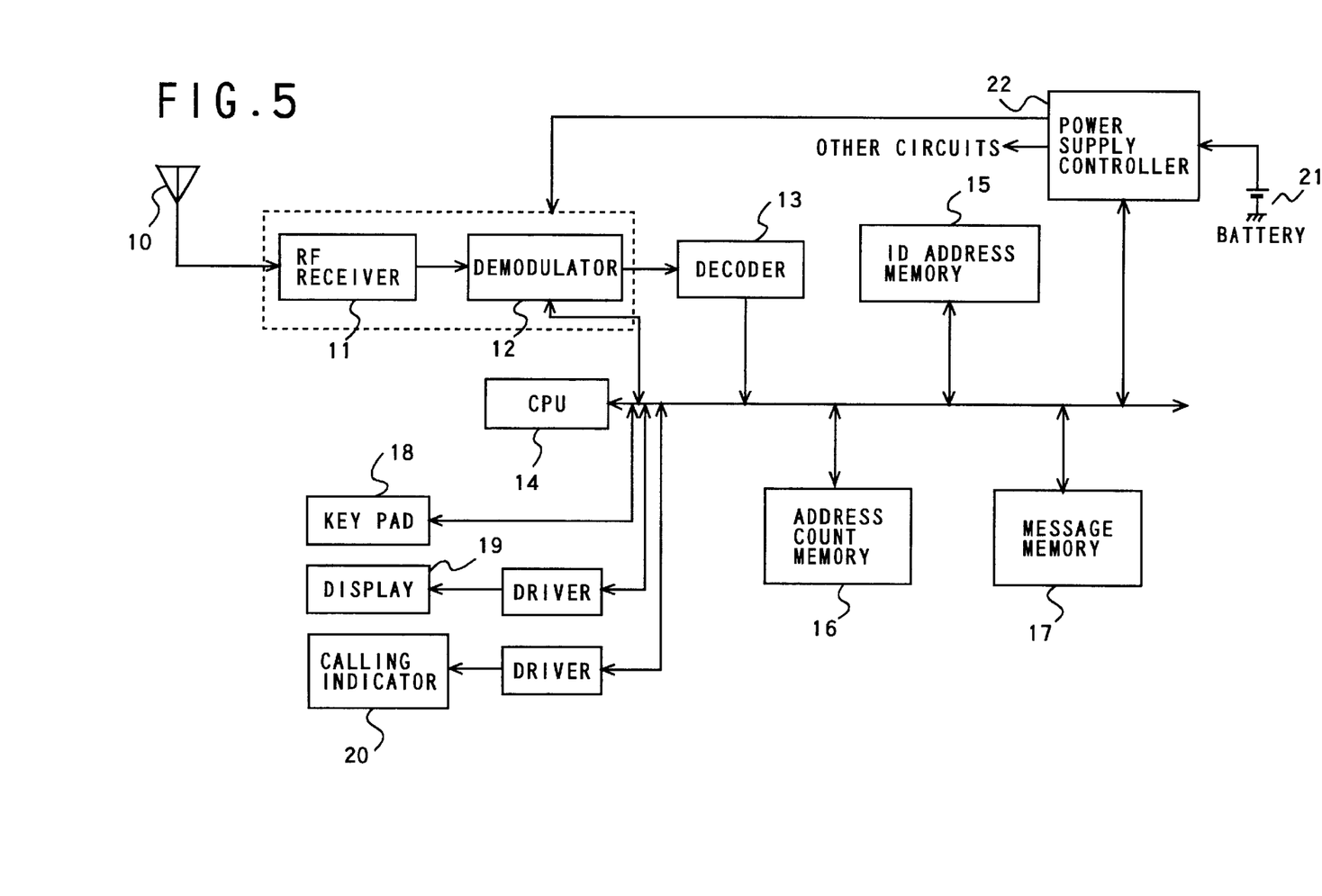
FIG. 5 is a block diagram showing a selective calling receiver in the embodiment.

FIG. 5 is a block diagram showing an embodiment of a selective calling receiver according to the invention. A battery-powered receiver has a receiver circuit which is comprised of a built-in antenna 10, a RF receiver 11 and a demodulator 12. Receiving demodulated signal from the demodulator 12, a decoder 13 decodes it into receiving data.

When inputting the receiving data from the decoder 13, a processor 14 performs a receiving control by using an ID address memory 15, an address count memory 16 and a message memory 17 in accordance with instructions input by a user through a key pad 18, which will be described in detail later. The ID address memory 15 stores the address of its own or the predetermined ID (identification) number of this receiver.

Under the control of the processor 14, the received message and other necessary data are displayed on a display 19 through a display driver, and a calling indicator 20 is operated through a driver upon receipt of an incoming call. The receiver has a battery 21 therein, the power of which is supplied to the receiver circuits such as the RF receiver 11 and the demodulator 12 by a power supply controller 22 under control of the processor 14. For example, the power is supplied to those circuits intermittently at the time of intermittent receiving.

Receiving Operation

Figure 6:
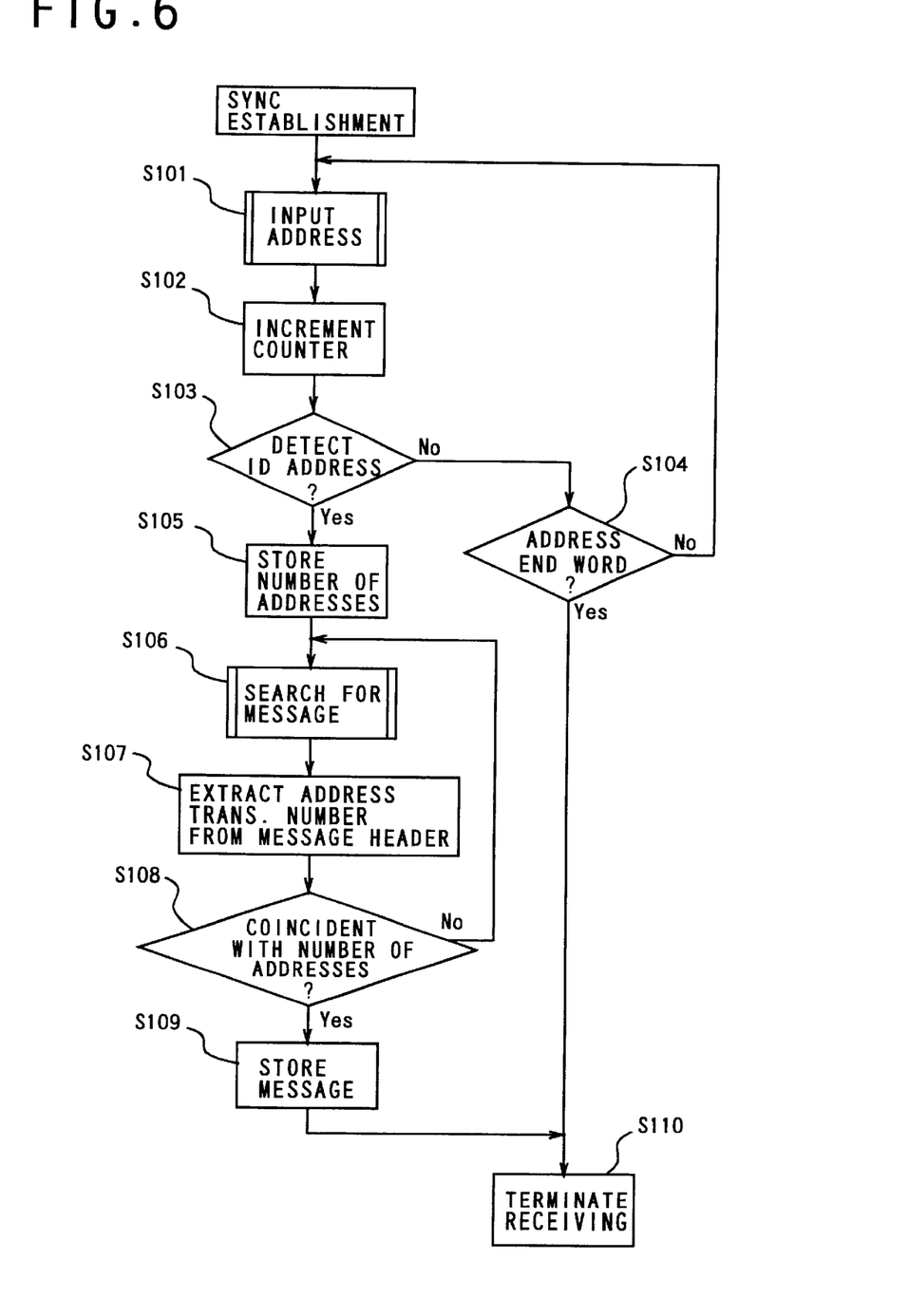
FIG. 6 is a flow chart showing a receiving operation of the selective calling receiver of the present embodiment.

FIG. 6 shows a receiving operation in the selective calling receiver of FIG. 5. The demodulator 12 establishes synchronization using the synchronization field of a signal frame as shown in FIG. 1. After the synchronization of the demodulator 12 has been established, the demodulated signal is transferred from the demodulator 12 to the decoder 13 which decodes the demodulated signal into the receiving data.

The processor 14 searches the address field (A1–A5) of the frame for its own address using the following procedure. First of all, when receiving the 1st address A1 (S101), the processor 14 increments an address counter (S102) and then determines whether the 1st address A1 coincides with the ID address stored in the ID address memory 15 (S103).

If the 1st address Al does not coincide with the ID address (No of S103), it is further determined whether it coincides with the address end word P (S104).

If it is not the address end word P, the processor 14 inputs the subsequent 2nd address A2 (S101) and increments the address counter (S102). Such a n address retrieval step is repeated until the ID address is detected.

Assuming that the ID address is located at the 3rd address A3. Each time inputting the 1st address A1 and then the 2nd address A2, the processor 14 increments the address counter but skips these addresses.

When inputting the third address A3, the processor 14 increments the address count to the count '3', (S102), and then detects the ID address (Yes of S103). When the ID address is detected, the address count '3', at that time is stored onto the address count memory 16 (S105).

Subsequently, the message retrieval is started (S106). The processor 14 discriminates the message header MH from the bit string received from the decoder 13 by finding the message header indicating signal F. After extracting the address transmission number A of 5 bits from the message header MH (S107), the processor 14 determines whether this address transmission number A is coincident with the address count stored in the address count memory 16 (S108).

If not coincident, the subsequent message header MH is input (S106) and its address transmission number A is checked similarly (S107 and S108). If the address transmission number A is coincident with the address count stored in the address count memory 16 (Yes of S108), the message which follows the message header MH is stored onto the message memory 17 as the message addressed to itself (S109). And, the receiving operation is terminated (S110).

Assuming that the ID address is located at the 3rd address A3, the address transmission numbers of the messages M1 and M2 are not coincident with the address count stored in the address count memory 16 but the address transmission number of the message M3 is coincident with it. Therefore, the message of the message M3 is stored onto the message memory 17 in accordance with the message type T and the message length signal N of the message header MH of the message M3. The processor 14 informs the user of an incoming call by the calling indicator 20 and reads out the message from the message memory 17 to display the message and other necessary data on the display 19.

Comparison

The selective calling system as mentioned above will be compared with other systems in message efficiency. In order to transmit an alphanumeric message of 40 characters, the embodiment according to the present invention requires a total of 16 words comprising an address of 1 word and a message of 15 words. On the other hand, the POCSAG system requires 15 words for transmitting the same message. Therefore, the overhead of the message signal increases by about 7% in comparison with the POCSAG system.

Since the embodiment is different in word structure from the ERMES system, a simple comparison is not useful. However, the ERMES system requires 20 words for transmission of the similar message. Therefore, the embodiment causes the transmission efficiency to be improved by about 20%. Especially, in the case of a message of a relatively short length such as a numeric message, a remarkable improvement in transmission efficiency is achieved. For example, when a message of 10 characters is transmitted, the ERMES system needs 7 words but the embodiment only 4 words.

What is claimed is:

1. A method for transmitting data from a transmitter to a plurality of receivers, the method comprising the steps of:

at the transmitter, (a) transmitting first signals each having a first time period which is divided into a plurality of frames, each of the frames comprising:
a synchronization field;
an address field comprising a plurality of addresses associated with the receivers, respectively; and a message field comprising a plurality of messages corresponding to the addresses, respectively, each of the messages comprising a message and a message header which includes an address transmission number of an address corresponding to the message, said address transmission number indicating a transmission order of each of the addresses within said address field, and at each of the receivers, (b) receiving a frame of at least one of the first signals;

(c) sequentially searching the address field for an address of the receiver itself while incrementing an address count at each address searched;

(d) storing the address count when the address of the receiver itself is found; and (e) selecting a message addressed to the receiver itself from the message field by comparing the address count stored with the address transmission number included in the message header.

2. The method according to claim 1, wherein the address field is terminated by a predetermined word.

3. The method according to claim 2, further comprising the steps of:

terminating the step (c) when the predetermined word is found; and returning to the step (b).

4. The method according to claim 1, wherein the message header comprises:

a first field for containing a message header indicator;

a second field for containing the adress transmission number;

a third field for containing a message type; and a fourth field for containing a message length.

5. The method according to claim 4, wherein the step (e) comprises:

detecting a message header from the message field;

comparing the address count stored with the address transmission number included in the message header; and selecting the message addressed to the receiver itself when the address count stored is coincident with the address transmission number in accordance with the message type and the message length.

6. The method according to claim 2, wherein the message header comprises:

a first field for containing a message header indicator;

a second field for containing the adress transmission number;

a third field for containing a message type; and a fourth field for containing a message length.

7. The method according to claim 6, further comprising the steps of:

terminating the step (c) when the predetermined word is found; and returning to the step (b).

8. The method according to claim 6, wherein the step (e) comprises:

detecting a message header from the message field;

comparing the address count stored with the address transmission number included in the message header; and selecting the message addressed to the receiver itself when the address count stored is coincident with the address transmission number in accordance with the message type and the message length.

9. A transmitting method for transmitting data from a transmitter to a plurality of receivers, the method comprising the steps of:

(a) dividing a predetermined time period into a plurality of frames, in each of the frames (b) generating a synchronization signal;

(c) sequentially generating a plurality of address signals associated with the receivers, respectively;

(d) storing an address transmission count which is incremented at each address signal;

(e) sequentially generating a plurality of message signals corresponding to the address signals, respectively, each of the message signals comprising a message and a message header which includes the address transmission count of an address signal corresponding to the message signal, said address transmission count indicating a transmission order of each of the addresses within said address field; and (f) transmitting the frames to the receivers.

10. The method according to claim 9, wherein the address signals is terminated by a predetermined word.

11. The method according to claim 9, wherein the message header comprises:

a first field for containing a message header indicator;

a second field for containing the adress transmission count;

a third field for containing a message type; and a fourth field for containing a message length.

12. A receiver comprising:

receiving means for receiving a frame of at least a first signal, said frame comprising a synchronization field, an address field comprising a plurality of addresses associated with the receivers, respectively, and a message field comprising a plurality of messages corresponding to the addresses, respectively, each of the messages comprising a message and a message header which includes an address transmission number of an address corresponding to the message, said address transmission number indicating a transmission order of each of the addresses within said address field;

searching means for sequentially searching the address field for an address of the receiver itself while incrementing an address count at each address searched;

storage means for storing the address count when the address of the receiver itself is found; and message selecting means for selecting a message addressed to the receiver itself from the message field by comparing the address count stored with the address transmission number included in the message header.

13. The receiver according to claim 12, wherein the address field is terminated by a predetermined word.

14. The receiver according to claim 13, wherein the searching means stops searching the address field when the predetermined word is found.

15. The receiver according to claim 12, wherein the message header comprises:

a first field for containing a message header indicator;

a second field for containing the adress transmission number;

a third field for containing a message type; and a fourth field for containing a message length.

16. The receiver according to claim 15, wherein the message selecting means comprises:

- header detecting means for detecting a message header from the message field;
- comparing means for comparing the address count stored with the address transmission number included in the message header; and
- selecting means for selecting the message addressed to the receiver itself when the address count stored in coincident with the address transmission number in accordance with the message type and the message length.

17. A selective calling receiver comprising:

- receiving means for intermittently receiving a first signal comprising a plurality of frames, each of the frames comprising an address field of addresses and a message field of messages, the respective addresses being associated with the messages, each of the messages including an address transmission number, said address transmission number indicating a transmission order of each of the addresses within said address field;
- searching means for sequentially searching the address field for an address of the selective calling receiver itself while incrementing an address count at each address searched;
- storage means for storing the address count when the address of the selective calling receiver itself is found; and
- message selecting means for selecting a message addressed to the selective calling receiver itself from the message field by comparing the address count stored with the address transmission number.

18. The selective calling receiver according to claim 17, wherein the address field is terminated by a predetermined word.

19. The selective calling receiver according to claim 18, wherein the searching means stops searching the address field when the predetermined word is found.

20. The selective calling receiver according to claim 17, wherein each the message comprises a message header and message data, the message header comprising:

- a first field for containing a message header indicator;
- a second field for containing the adress transmission number;
- a third field for containing a message type; and
- a fourth field for containing a message length.

21. The selective calling receiver according to claim 20, wherein the message selecting means comprises:

- header detecting means for detecting a message header from the message field;
- comparing means for comparing the address count stored with the address transmission number included in the message header; and
- selecting means for selecting the message data addressed to the selective calling receiver itself when the address count stored in coincident with the address transmission number in accordance with the message type and the message length.

22. A receiving method for receiving a first signal comprising a plurality of frames, each of the frames comprising an address field of addresses and a message field of messages, the addresses being associated with the messages, respectively, and each of the messages including an address transmission number, said adress transmission number indicating a transmission order of each of the addresses within said address field, the receiving method comprising the steps of:

(a) sequentially searching the address field for a specific address indicating a relevant receiver while incrementing an address count at each address searched;

(b) storing the address count when the specific address is found; and (c) selecting a specific message addressed to the relevant receiver from the message field by comparing the address count stored with the address transmission number.

23. The receiving method according to claim 22, wherein the address field is terminated by a predetermined word.

24. The receiving method according to claim 23, further comprising the step of:

terminating the step (a) when the predetermined word is found.

25. The receiving method according to claim 22, wherein each the message comprises a message header and message data, the message header comprising:

- a first field for containing a message header indicator;
- a second field for containing the adress transmission number;
- a third field for containing a message type; and
- a fourth field for containing a message length.

26. The method according to claim 25, wherein the step (c) comprises the steps of:

- detecting a message header from the message field;
- comparing the address count stored with the address transmission number included in the message header; and
- selecting the message data addressed to the relevant receiver when the address count stored is coincident with the address transmission number in accordance with the message type and the message length.

27. The selective calling receiver according to claim 17, further comprising:

- a battery as a power supply of the selective calling receiver; and
- power control means for controlling the battery such that power is supplied to at least the receiving means in accordance with intermittent timing of receiving a frame of the first signal.

* * * * *